United States Patent
Omino (10) Patent No.: US 9,024,257 B2
(45) Date of Patent: May 5, 2015

(54) WORK ASSISTANCE SYSTEM, TERMINAL, METHOD AND PROGRAM

(75) Inventor: Takayuki Omino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/131,546

(22) PCT Filed: Jun. 4, 2012

(86) PCT No.: PCT/JP2012/003646
§ 371 (c)(1),
(2), (4) Date: Jan. 8, 2014

(87) PCT Pub. No.: WO2013/008381
PCT Pub. Date: Jan. 17, 2013

(65) Prior Publication Data
US 2014/0145079 A1  May 29, 2014

(30) Foreign Application Priority Data
Jul. 11, 2011  (JP) .................................. 2011-152851

(51) Int. Cl.
G01J 1/00 (2006.01)
G01T 1/18 (2006.01)
G01T 1/02 (2006.01)
G01T 7/00 (2006.01)

(52) U.S. Cl.
CPC ... G01T 1/18 (2013.01); G01T 1/02 (2013.01); G01T 7/00 (2013.01)

(58) Field of Classification Search
USPC ..................................................... 250/336.1
See application file for complete search history.

(56) References Cited

U.S. PATENT DOCUMENTS 4,970,589 A * 11/1990 Hanson et al. ................ 348/158
5,200,827 A *  4/1993 Hanson et al. ............. 348/216.1
(Continued)

FOREIGN PATENT DOCUMENTS

JP    11-326521 A    11/1999
JP    2004-251728 A    9/2004
(Continued)

OTHER PUBLICATIONS

Shinichi Ono, "Hoshasen no Tanjo", Radiological Sciences, vol. 43, Jutsugyo-kohosha, Feb. 25, 2000, pp. 43-46. See cited doc on p. 2 of translated ISR for explanation of relevance.
International Search Report for PCT Application No. PCT/JP2012/003646, mailed on Jul. 24, 2012.
Supplementary European Search Report for EP Application No. 12811396.6 issued Feb. 6, 2015.

*Primary Examiner* — David J Makiya
*Assistant Examiner* — Taeho Jo
(74) *Attorney, Agent, or Firm* — Sughrue Mion, PLLC (57) ABSTRACT

A system includes a first wearable terminal connected to a measurement device capable of measuring predetermined physical amounts and a second wearable terminal connected to a head-mounted display device, wherein the first wearable terminal includes a distance calculation means for calculating a distance from the second wearable terminal and a predicted value calculation means for calculating a predicted value of the predetermined physical amount at a position of the second wearable terminal based on a measurement value of the predetermined physical amount measured by the measurement device and the calculated distance, and the second wearable terminal includes a display control means for controlling to display the predicted value calculated by the predicted value calculation means on the head-mounted display device.

10 Claims, 7 Drawing Sheets

(56) References Cited

U.S. PATENT DOCUMENTS

| | | |
|---|---|---|
| 6,492,957 B2 * | 12/2002 | Carillo et al. ............... 343/841 |
| 2002/0180606 A1 * | 12/2002 | Kitaguchi et al. ......... 340/573.1 |
| 2008/0302967 A1 | 12/2008 | Klann et al. |
| 2011/0270135 A1 * | 11/2011 | Dooley et al. ............... 600/595 |
| 2013/0148099 A1 * | 6/2013 | Stautmeister ............... 356/4.01 |
| 2014/0066124 A1 * | 3/2014 | Novet ....................... 455/556.1 |
| 2014/0197965 A1 * | 7/2014 | Park et al. ............... 340/870.09 |

FOREIGN PATENT DOCUMENTS

| | | |
|---|---|---|
| JP | 2005-49148 A | 2/2005 |
| JP | 2005-249667 A | 9/2005 |
| JP | 2006-293906 A | 10/2006 |
| JP | 2008-026185 A | 2/2008 |

* cited by examiner

EXEMPLARY SIMULATION INPUT DATA

| ITEM | CONTENTS |
|---|---|
| WEATHER DATA | DIRECTION OF WIND, VELOCITY OF WIND, PRECIPITATION, ATMOSPHERIC STABILITY, AMOUNT OF INSOLATION, NET RADIATION<br>GPV DATA (VELOCITY OF WIND (U, V COMPONENTS), ATMOSPHERIC PRESSURE, TEMPERATURE, SPECIFIC HUMIDITY, PRECIPITATION, AMOUNT OF CLOUD)<br>AMeDAS DATA (DIRECTION OF WIND, VELOCITY OF WIND, PRECIPITATION) |
| RADIATION SOURCE INFORMATION | SITE AND FACILITY NAMES, RADIATION START TIME, RADIATION DURATION, NUCLEAR NAME AND ITS RADIATION RATE |
| SITE DATA | SITE NAME, FACILITY NAME, LATITUDE, LONGITUDE, STACK ALTITUDE, TYPE OF REACTOR |
| DOSE CONVERSION COEFFICIENT | NUCLEAR-BASED CONVERSION COEFFICIENTS INTO EFFECTIVE DOSE, ETC. |
| NUCLEAR COMPOSITION RATIO DATA | IN-FUEL ROD COMPOSITION RATIO, ETC., BASED ON REACTOR TYPE AND BURNUP OF RARE GAS AND IODINE |
| GEOMORPHOLOGIC DATA | MAP, LAND USE DATA |

WORK ASSISTANCE SYSTEM, TERMINAL, METHOD AND PROGRAM

This application is a National Stage Entry of PCT/JP2012/003646 filed Jun. 4, 2012, which claims priority from Japanese Patent Application 2011-152851 filed Jul. 11, 2011, the contents of all of which are incorporated herein by reference, in their entirety.

TECHNICAL FIELD

The present invention relates to a work assistance system, a wearable terminal, a work assistance method, and a work assistance program.

BACKGROUND ART

Electric power companies require workers who work in a radiation controlled area, such as a nuclear plant or the like to carry a small-sized electronic radiation counter such as Geiger counter or dosimeter which sets off an alarm when the amount of radiation of each plant worker exceeds a permitted limit. Worker normally work while monitoring the amount of radiation and if the Geiger counter or dosimeter alarms goes off, workers must immediately suspend their work and move away from the site. PLT 1 describes therein a gas density measurement system, for example, as a technique for assisting such a work.

CITATION LIST

Patent Literature

PLT 1: JP 2006-293906 A

SUMMARY OF INVENTION

Technical Problem

However, should an accident occur in a nuclear power plant, for example, by a natural disaster such as an earthquake, many Geiger counters may break and become disabled. In such a case, it is assumed that a single Geiger counter will be shared among a team of workers and that they will work in close proximity to the worker carrying the Geiger counter. Therefore, workers will not be able to work too far away from the worker carrying the Geiger counter, and will have to orally confirm and share the radiation level data.

With the method described in PLT 1, gas density information detected by a gas sensor is transmitted from the master unit to slave units and the slave units display the received gas density information on a display means so that the gas density information can be shared among the workers. However, with the method described in PLT 1, the detected gas density information is transmitted from the master unit to the slave units although the gas density is assumed to be different depending on a position of an slave unit or a distance from the gas sensor. Therefore, if an slave unit receives the gas density information at a position far away from the gas sensor, the received gas density information is less accurate as information on the gas density at the position of the slave unit.

That is, with the method described in PLT 1, the gas density information detected by the gas sensor can be shared among the workers, but the workers need to work near the gas sensor in order to keep the information accurate and to secure safety. Thus, an activity range of the team of workers is limited.

It is therefore an object of the present invention to provide a work assistance system, a wearable terminal, a work assistance method and a work assistance program enabling workers to safely work even at a position far away from a measurement device when the workers work by sharing measurement data measured by the measurement device in order to secure safety.

Solution to Problem

A work assistance system according to the present invention includes a first wearable terminal connected to a measurement device capable of measuring predetermined physical amounts and a second wearable terminal connected to a head-mounted display device, wherein the first wearable terminal includes a distance calculation means for calculating a distance from the second wearable terminal and a predicted value calculation means for calculating a predicted value of the predetermined physical amount at a position of the second wearable terminal based on a measurement value of the predetermined physical amount measured by the measurement device and the distance calculated by the distance calculation means, and the second wearable terminal includes a display control means for controlling to display the predicted value calculated by the predicted value calculation means on the head-mounted display device.

A wearable terminal according to the present invention includes a distance calculation means for calculating a distance from other wearable terminal, and a predicted value calculation means for calculating a predicted value of the predetermined physical amount at a position of the other wearable terminal based on a measurement value of the predetermined physical amount measured by a measurement device capable of measuring predetermined physical amounts and the distance calculated by the distance calculation means.

A work assistance method according to the present invention includes the steps of calculating a distance between a first wearable terminal connected to a measurement device capable of measuring predetermined physical amounts and a second wearable terminal connected to a head-mounted display device, calculating a predicted value of the predetermined physical amount at a position of the second wearable terminal based on a measurement value of the predetermined physical amount measured by the measurement device and the calculated distance, and controlling to display the calculated predicted value on the head-mounted display device.

A work assistance program according to the present invention causes a computer to perform a distance calculation processing of calculating a distance from other wearable terminal, and a predicted value calculation processing of calculating a predicted value of the predetermined physical amount at a position of the other wearable terminal based on a measurement value of the predetermined physical amount measured by a measurement device capable of measuring predetermined physical amounts and the calculated distance.

Advantageous Effects of Invention

According to the present invention, workers can safely work even at a position far away from a measurement device when the workers work by sharing measurement data measured by the measurement device in order to secure safety.

DESCRIPTION OF EMBODIMENTS

Figure 1:
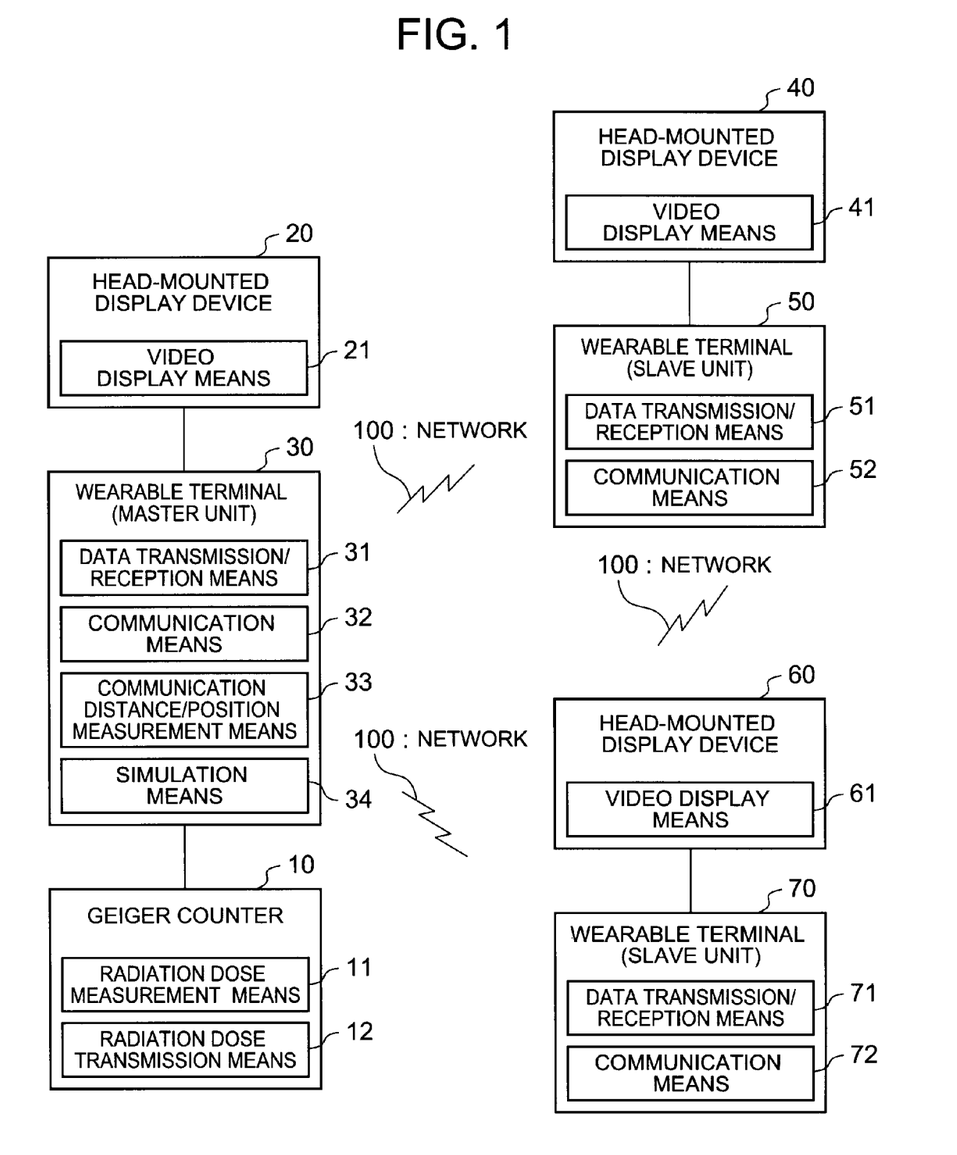
[FIG. 1] It depicts a block diagram illustrating an exemplary structure of a work assistance system according to the present invention.

An exemplary embodiment according to the present invention will be described below with reference to the drawings. FIG. 1 is a block diagram illustrating an exemplary structure of a work assistance system according to the present invention. As illustrated in FIG. 1, the work assistance system includes a Geiger counter 10, a head-mounted display device 20, a wearable terminal 30, a head-mounted display device 40, a wearable terminal 50, a head-mounted display device 60, and a wearable terminal 70. The wearable terminal 30, the wearable terminal 50 and the wearable terminal 70 operate under program control, and are mutually connected via a network 100 such as ad-hoc communication.

The Geiger counter 10 is specifically a small-sized electronic radiation counter, and includes a function of measuring the number of radiation. The Geiger counter 10 includes a radiation dose measurement means 11 and a radiation dose transmission means 12.

The radiation dose measurement means 11 includes a function of numerically measuring an intensity of radioactivity as the amount of radiation, and can measure the amount of radiation in a unit such as Sv/h (Sievert per hour) or CPM (Counts Per Minute).

The radiation dose transmission means 12 includes a function of transmitting a numerical value (which may be called radiation dose measurement data) indicating the amount of radiation measured by the radiation dose measurement means 11 to the wearable terminal 30. The Geiger counter 10 and the wearable terminal 30 are connected to each other in a wired (such as Ethernet (registered trademark) cable or USB cable) or wireless (such as Bluetooth (registered trademark), wireless LAN or Zigbee (registered trademark)) computer interface.

The head-mounted display device 20 is specifically a glasses-type display device. The head-mounted display device 20 includes a video display means 21.

The video display means 21 includes a function of displaying a video (such as still image or animation) transmitted from the wearable terminal 30. In the present exemplary embodiment, the glasses-type head-mounted display device 20 is used, but not limited thereto, any device wearable on the head such as helmet-type or goggles-type display device may be used. In the present exemplary embodiment, all of glasses-type, helmet-type, goggles-type, retina radiation type and optical devices are collectively called head-mounted display devices according to a typical expression.

The wearable terminal 30 is a small-size information processing device wearable on a worker, and operates according to a program. The wearable terminal 30 includes a storage device such as CPU or memory, and includes a data transmission/reception means 31, a communication means 32, a communication distance/position measurement means 33, and a simulation means 34. The wearable terminal 30 is connected to the Geiger counter 10 and the head-mounted display device in a wired or wireless manner. In the present exemplary embodiment, each wearable terminal mounts thereon various sensors (such as triaxial gyroscope, acceleration sensor, GPS receiver, digital compass and proximity sensor).

The data transmission/reception means 31 is realized by the CPU operating according to a program. The data transmission/reception means 31 includes a function of transmitting/receiving radiation dose measurement data to/from the Geiger counter 10 or other wearable terminals (50, 70) by use of the communication means 32 realized by the network interface unit of the wearable terminal.

The communication distance/position measurement means 33 includes a function of measuring a distance from other wearable terminal (50, 70) and detecting a position of each wearable terminal via the network 100 (which is specifically realized by ad-hoc communication in a wireless LAN). The communication distance/position measurement means 33 outputs distance/position information on the measured distance and position to the simulation means 34.

For example, the communication distance/position measurement means 33 calculates distance information on a distance between wearable terminals based on information such as electric field intensity or delay time acquired via the communication between the wearable terminal 30 and the wearable terminals 50, 70. For example, the communication distance/position measurement means 33 makes three-point measurement (specifically, finds a positional relationship based on each length and angles of a polygon formed by connecting the positions of the wearable terminals) based on the calculated distance information thereby to calculate position information on the positions of the wearable terminals. The wearable terminal 30 cannot directly measure a distance between the wearable terminal 50 and the wearable terminal 70, and thus, on three-point measurement, the wearable terminal 50 or the wearable terminal 70 may measure the distance therebetween and transmit the distance information to the wearable terminal 30.

The network 100 illustrated in FIG. 1 is realized according to a communication standard such as ad-hoc communication (wireless LAN) or Bluetooth. The communication distance/position measurement means 33 can measure distance/positions between/of the wearable terminals by use of ad-hoc communication even if a communication infrastructure is not prepared at the site. If a network infrastructure (such as wireless LAN access point) is present at the site, it may be used to measure distance/positions between/of the wearable terminals.

The communication distance/position measurement means 33 can measure position information between the wearable terminals with high accuracy by use of various sensors (such as triaxial gyroscope, acceleration sensor, GPS receiver, digital compass and proximity sensor) mounted on the wearable terminals. For example, the communication distance/position measurement means 33 may acquire position information of the wearable terminals by use of the GPS receivers, and calculate distances between the wearable terminals based on the position information acquired by each wearable terminal.

The simulation means 34 includes a function of simulating the amount of radiation at a position of other wearable terminal based on the radiation dose measurement data measured by the Geiger counter 10 and the information such as the distances/positions between/of the wearable terminals (30, 50, 70).

The simulation means 34 makes inverse-square law density/dose calculation, local weather prediction calculation, wind field calculation, and the like, for example, thereby to simulate the amount of radiation at a position of other wearable terminal. Further, the simulation means 34 simulates the amount of radiation at a position of other wearable terminal based on the input data illustrated in FIG. 2, for example.

Figure 3:
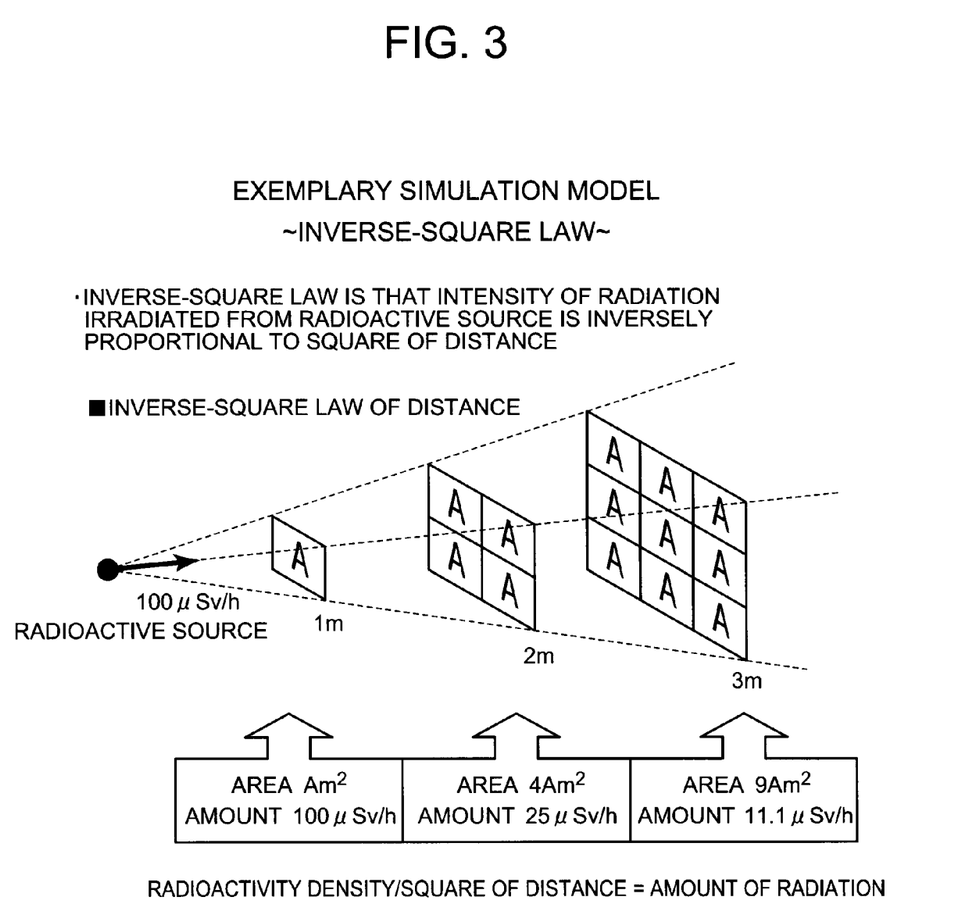
[FIG. 3] It depicts an explanatory diagram illustrating an exemplary simulation model.

Exemplary simulation of the amount of radiation by inverse-square law density/dose calculation will be described herein. FIG. 3 is an explanatory diagram illustrating an exemplary simulation model. As illustrated in FIG. 3, the inverse-square law is that in an application to the amount of radiation, an intensity of radiation irradiated from a radioactive source is inversely proportional to the square of a distance. According to the law, a predicted value of the amount of radiation at a position far away from the Geiger counter can be found by use of the equation of the radioactivity density at a radioactive source/square of distance for the amount of radiation.

Figure 2:
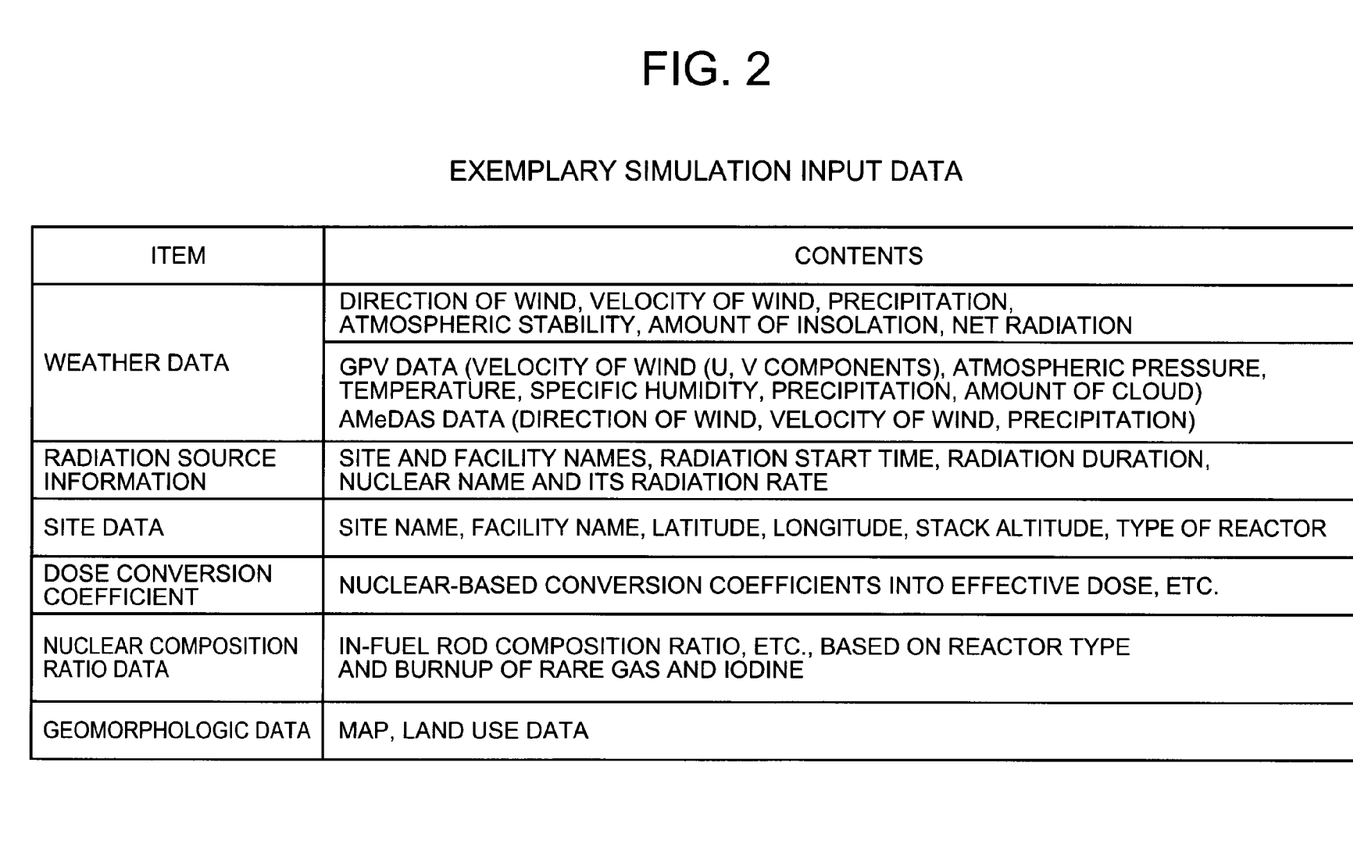
[FIG. 2] It depicts an explanatory diagram illustrating exemplary input data used for simulation.

For example, it is assumed that the position of a radioactive source (or generation source) is previously known (emission source information illustrated in FIG. 2 is used, for example). It is further assumed that a team of workers goes toward the radioactive source and the head worker has a Geiger counter. That is, the amount of radiation is maximum at a position of the head worker. In this case, the wearable terminal 30 calculates the distance from the radioactive source based on a measurement result at its position, and finds a radioactivity density (proportional constant) at the radioactive source based on the calculated distance and a measurement value of the Geiger counter 10 at its position. The radioactivity density at the radioactive source is found so that a simulation equation is defined. For example, the wearable terminal 30 finds a predicted value of the amount of radiation at a position of the wearable terminal 50 based on the radioactivity density at the radioactive source, the distance between the radioactive source and the wearable terminal 30, and the distance between the wearable terminal 30 and the wearable terminal 50.

For example, a distance between the radioactive source and the wearable terminal 30 may be found with higher accuracy by acquiring position information of the wearable terminal 30 by use of the GPS receiver of the wearable terminal 30. In this case, an orientation by the digital compass is used or three-point measurement is made so that position information of an "extension" wearable terminal can be found. Therefore, in this case, it does not need to be assumed that the team of workers goes toward the radioactive source and the head worker has a Geiger counter. The wearable terminal 30 can find a predicted value of the amount of radiation at a position of each wearable terminal based on the radioactivity density at the radioactive source, and the distances between the radioactive source and each wearable terminal found from the position information of the radioactive source and the respective wearable terminals. For example, if each wearable terminal mounts thereon a highly-accurate GPS receiver, the GPS receivers may use the received position information, respectively.

For example, if a measurement value is mutually transmitted/received by use of a plurality of Geiger counters, a position or direction where the amount of radiation is large may be specified based on a measurement value of each Geiger counter and a predicted value of the amount of radiation at other position may be found assuming the specified position as a radioactive source.

The simulation means 34 may correct a predicted value of the amount of radiation found by the inverse-square law density/dose calculation based on the input data illustrated in FIG. 2. For example, the simulation means 34 predicts a diffusion situation of radioactive materials by making local weather prediction calculation, wind field calculation or the like based on weather data, thereby correcting a predicted value of the amount of radiation at other position. For example, the simulation means 34 predicts a diffusion situation of radioactive materials based on geomorphologic data, thereby correcting a predicted value of the amount of radiation at other position.

The head-mounted display device 40 and the head-mounted display device 60 include the same functions as the head-mounted display device 20. Further, the wearable terminal 50 and the wearable terminal 70 do not include the communication distance/position measurement means 33 and the simulation means 34, but include the same functions as the wearable terminal 30 for other functions. The head-mounted display device 40 is mutually connected to the wearable terminal 50 in a wired or wireless manner. The head-mounted display device 60 is mutually connected to the wearable terminal 70 in a wired or wireless manner.

In the present exemplary embodiment, the wearable terminal 30 to which the Geiger counter 10 is connected and which performs the simulation processing is defined as a "main" wearable terminal in order to understandably explain and discriminate the wearable terminal 30, the wearable terminal 50 and the wearable terminal 70. Other wearable terminals (50, 70) controlled to display a simulation result on the head-mounted display devices (40, 60) are defined as "extension" wearable terminals. In the example illustrated in FIG. 1, the "extension" wearable terminal does not include the communication distance/position measurement means 33 and the simulation means 34 for simplified description, but may include the same.

The present exemplary embodiment is configured to include one Geiger counter and three wearable terminals, but may be configured to include a plurality of Geiger counters and a plurality of wearable terminals.

The present exemplary embodiment will be described assuming a working team of three workers A, B and C. The worker A is assumed to hold the Geiger counter 10 and to wear the head-mounted display device 20 and the wearable terminal 30. The worker B is assumed to wear the head-mounted display device 40 and the wearable terminal 50. The worker C is assumed to wear the head-mounted display device 60 and the wearable terminal 70. The present exemplary embodiment will be described for an example in which one worker wearing the "main" wearable terminal and two workers wearing the "extension" wearable terminals are present, but an application form is not limited thereto. For example, a plurality of workers hold the Geiger counters 10 and hold the "main" wearable terminals, respectively. Further, three or more workers each wearing the "extension" wearable terminal and the head-mounted display device may be present.

Figure 4:
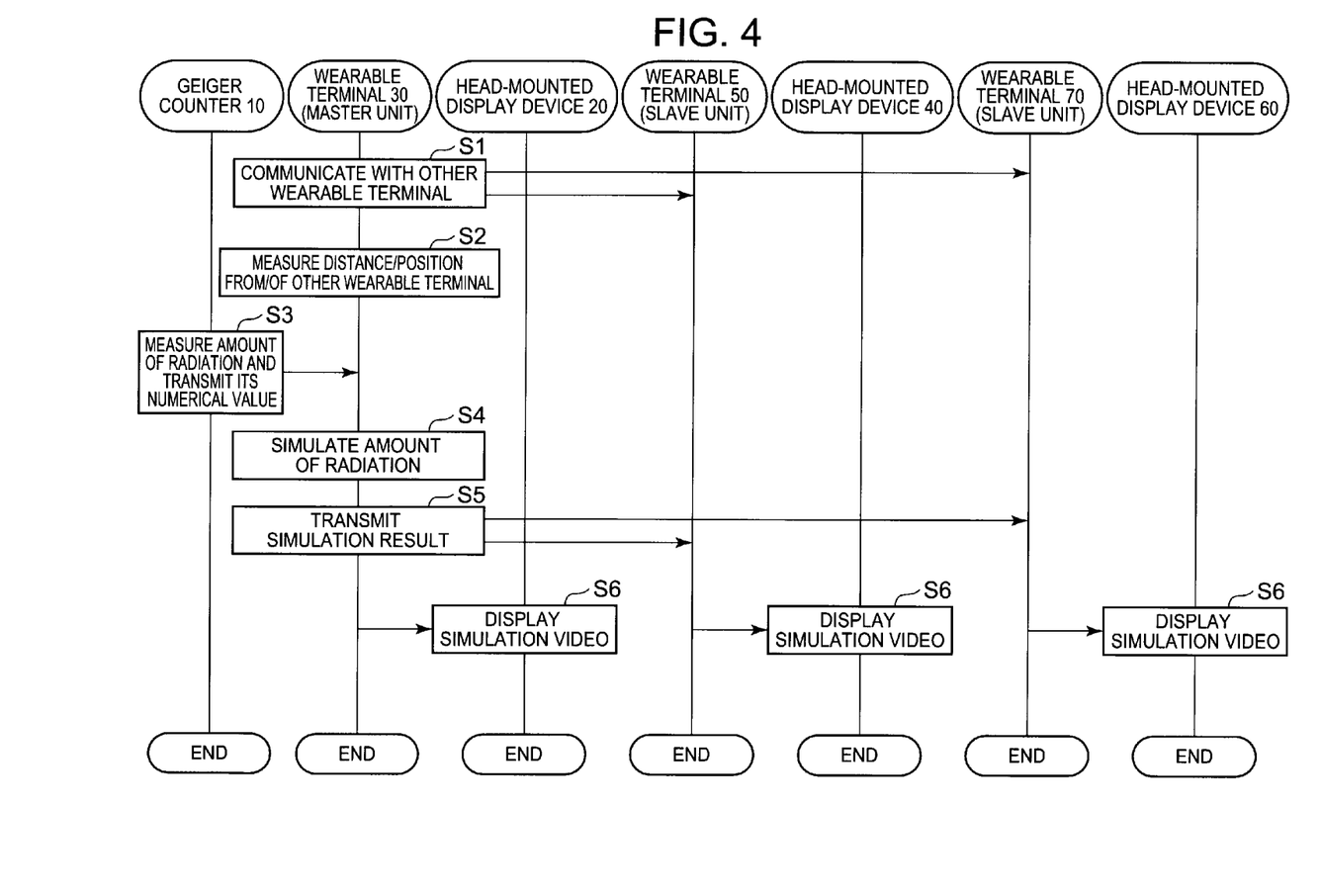
[FIG. 4] It depicts a flow diagram illustrating exemplary processings performed by the work assistance system.

The operations of the work assistance system will be described below. FIG. 4 is a flow diagram illustrating exemplary processings performed by the work assistance system.

The wearable terminal 30 connected with the Geiger counter 10 establishes communication with other wearable terminals (50, 70) via the network 100 according to an operation of the worker A (step S1 in FIG. 4).

When establishing communication, the wearable terminal 30 measures distances/positions from/of each wearable terminal (50, 70) (step S2 in FIG. 4).

For example, the communication distance/position measurement means 33 calculates distance information on a distance between the wearable terminals based on information such as electric field intensity or delay time acquired via the communication between the wearable terminal 30 and the wearable terminals 50 and 70. Further, the communication distance/position measurement means 33 calculates position information on the positions of the wearable terminals by three-point measurement based on the calculated distance information, for example. Position information of each wearable terminal is acquired by use of the GPS receiver, for example, not limited to the above method, and the distances between the wearable terminals may be calculated based on the acquired position information. The wearable terminal 30 makes distance/position measurement per predetermined period.

Figure 5:
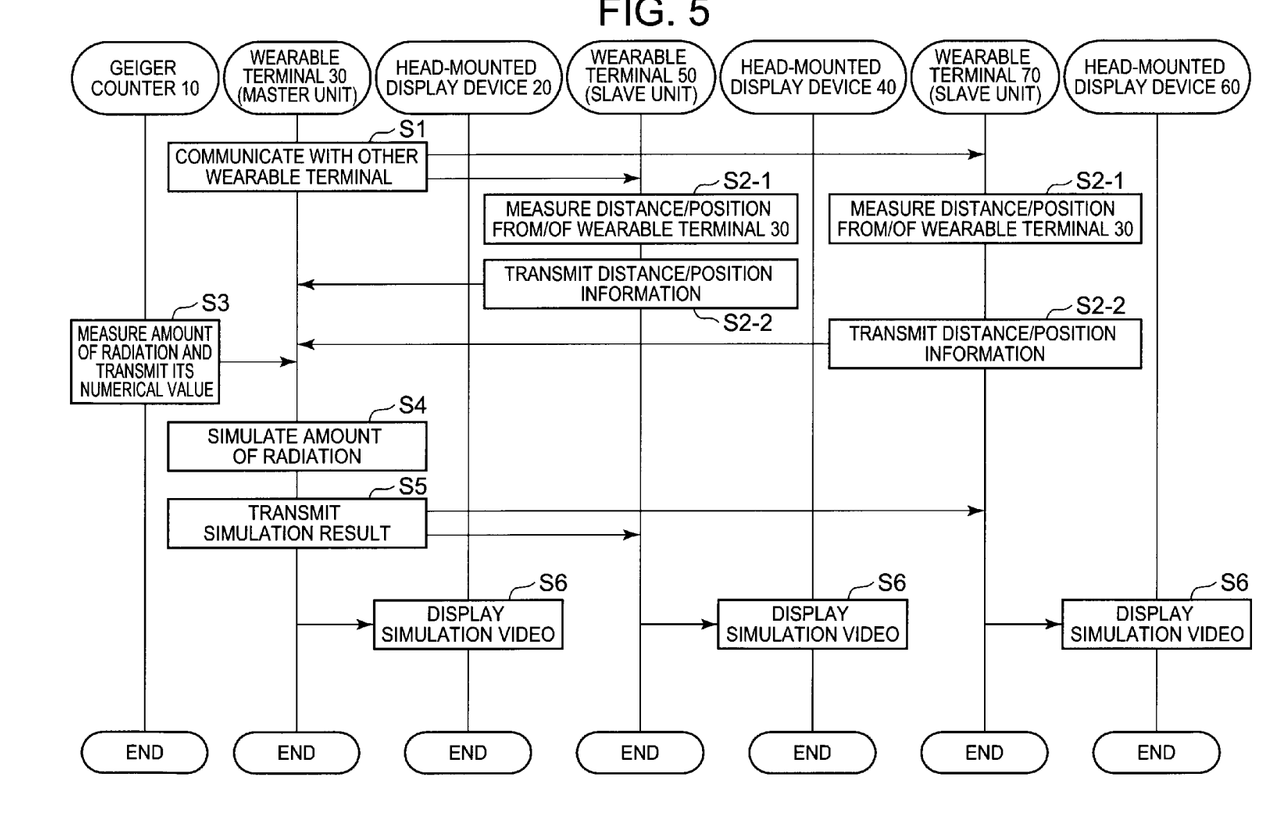
[FIG. 5] It depicts a flow diagram illustrating exemplary processings performed by the work assistance system.

The present exemplary embodiment indicates the case only the wearable terminal 30 includes the communication distance/position measurement means 33, but the wearable terminal 50 or the wearable terminal 70 may be configured to include the same. The exemplary operations are illustrated in FIG. 5 when the "extension" wearable terminals 50 and 70 include the communication distance/position measurement means 33, respectively. In this case, when communication is established, each wearable terminal (50, 70) makes distance/position measurement relative to the wearable terminal 30 (step S2-1 in FIG. 5), and transmits the measured distance/position information to the wearable terminal 30 (step S2-2 in FIG. 5). Further, the wearable terminal 50, 70 transmits the distance/position information to the wearable terminal 30 in real time. For example, the wearable terminal 50, 70 may transmit the distance/position information to the wearable terminal 30 every predetermined period.

When measuring the amount of radiation, the Geiger counter 10 connected to the wearable terminal 30 transmits the radiation dose measurement data to the wearable terminal 30 (step S3 in FIG. 4).

Then, the wearable terminal 30 simulates the amount of radiation at a position of each wearable terminal (50, 70) based on the radiation dose measurement data received from the Geiger counter 10 and the distance/position information (step S4 in FIG. 4).

The simulation means 34 in the wearable terminal 30 finds a predicted value of the amount of radiation at a position of other wearable terminal by making inverse-square law density/dose calculation, local weather prediction calculation, wind field calculation and the like, for example. The simulation model is not limited thereto.

When completing the simulation of the amount of radiation, the wearable terminal 30 transmits the simulation result (or the predicted value of the amount of radiation at a position of the transmission destination wearable terminal) to the wearable terminals (50, 70) (step S5 in FIG. 4).

Then, a data transmission/reception means (51, 71) in each wearable terminal (50, 70) controls to cause the connected head-mounted display device (40, 60) to display the simulation result. The data transmission/reception means 31 in the wearable terminal 30 controls to display the radiation dose measurement data received from the Geiger counter 10 on the connected head-mounted display device 20 (step S6 in FIG. 4). Herein, if the amount of radiation to be displayed exceeds a predetermined threshold, the wearable terminal may control to display an alarm.

Figure 6:
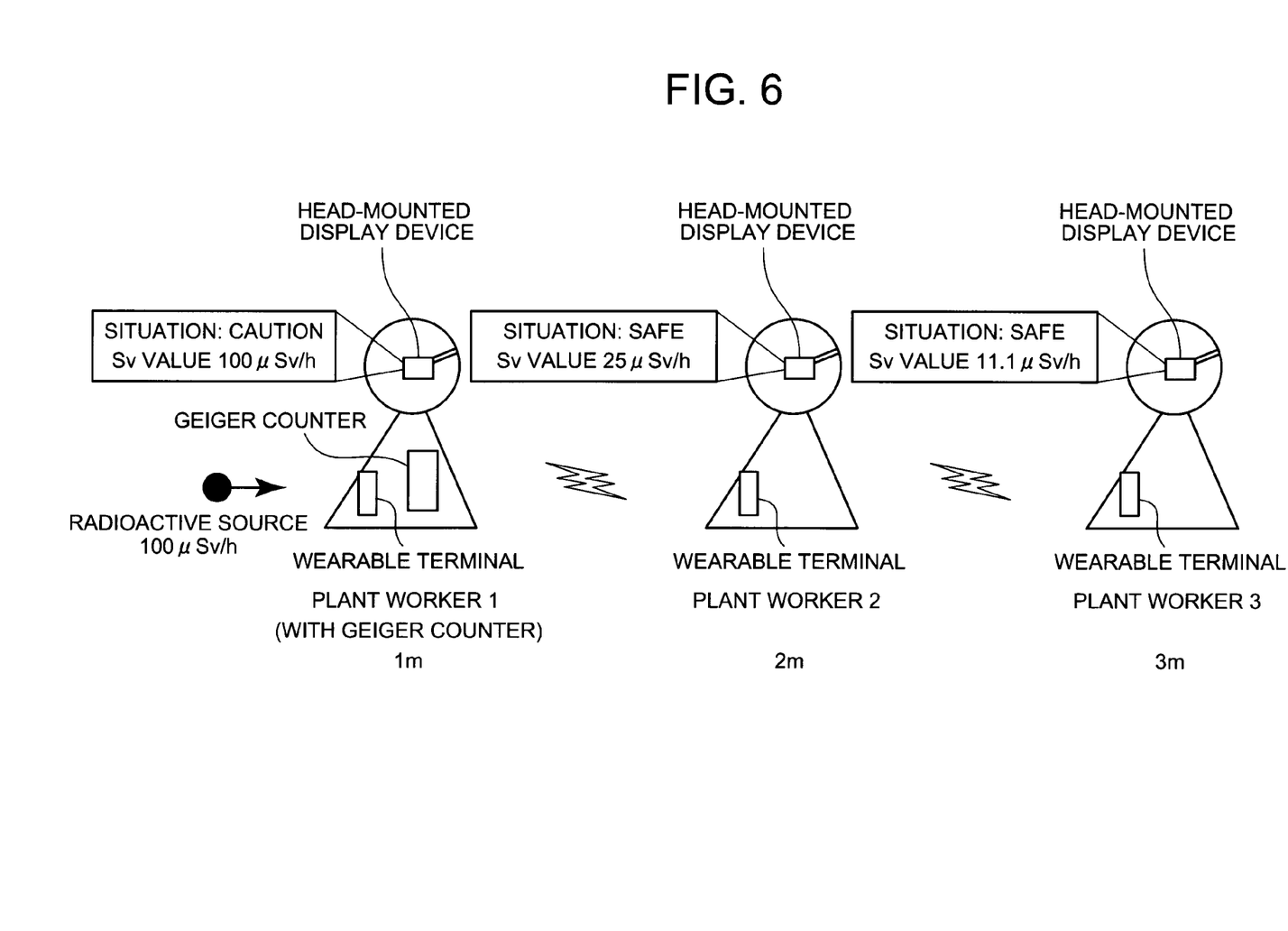
[FIG. 6] It depicts an explanatory diagram illustrating an exemplary application of the work assistance system.

FIG. 6 is an explanatory diagram illustrating an exemplary application of the work assistance system. In the example illustrated in FIG. 6, the head-mounted display device mounted on the plant worker A, 1 m away from the 100 μSv/h radioactive source, displays thereon a measurement value (100 μSv/h) of the Geiger counter, and information indicating that the measurement value exceeds the threshold and the situation is to be cared. The head-mounted display device mounted on the plant worker B, 2 m away from the radioactive source, displays thereon a predicted value (25 μSv/h) of the amount of radiation and information indicating that the predicted value does not exceed the threshold and the situation is safe. The head-mounted display device mounted on the plant worker C, 3 m away from the radioactive source, displays thereon a predicted value (11.1 μSv/h) of the amount of radiation and information indicating that the predicted value does not exceed the threshold and the situation is safe.

As described above, according to the present exemplary embodiment, the work assistance system includes the "main" wearable terminal connected to the Geiger counter and the "extension" wearable terminals, calculates distance/position information between the wearable terminals and calculates a predicted value of the amount of radiation at a position of each "extension" wearable terminal based on the calculated distance/position information and a measurement value of the Geiger counter. Then, the "extension" wearable terminal controls to display the predicted value on the head-mounted display device.

Therefore, according to the present exemplary embodiment, when a plurality of workers work while sharing a measurement value of the Geiger counter, they can grasp the amount of radiation even at a position away from the Geiger counter, thereby working under secured safety.

Even if the Geiger counters are not prepared for all the workers, less Geiger counters make measurements and data on their results is shared among the workers so that each worker can work while confirming the amount of radiation in real time. Further, the amount of radiation is displayed on the head-mounted display device, and thus each worker can work with both hands. Further, if a measurement device such as Geiger counter is expensive, a reduction in cost can be achieved.

The present exemplary embodiment has been described above by way of the exemplary structure including one master unit and three slave units, but when a plurality of "main" wearable terminals connected to the Geiger counters are present, the "extension" wearable terminals receive radiation dose measurement data from a "main" wearable terminal closest thereto in distance/position, respectively. Therefore, when a plurality of master units are present, a more accurate predicted value of the amount of radiation can be received as compared with the case of one master unit.

When a plurality of Geiger counters are used, a position or direction where the amount of radiation is large is specified based on a measurement value of each Geiger counter, and a predicted value of the amount of radiation at other position may be found assuming the specified position as a radioactive source. In this way, simulation is made based on the measurement values of the Geiger counters, thereby finding a more accurate predicted value of the amount of radiation.

The present exemplary embodiment is configured such that position information (the amount of radiation) of the wearable terminal is measured based on a distance between the terminals or radio wave intensity information via ad-hoc communication, but position information between the wearable terminals can be measured with high accuracy by use of various sensors (triaxial gyroscope, acceleration sensor, GPS receiver, digital compass and proximity sensor) mounted on the wearable terminals.

The present exemplary embodiment has been described above by way of the example using a Geiger counter, but may be applied to a form using gas measurement/detection device or chemical materials' measurement/detection device in place of the Geiger counter.

A minimum structure of the work assistance system according to the present invention will be described below.

Figure 7:
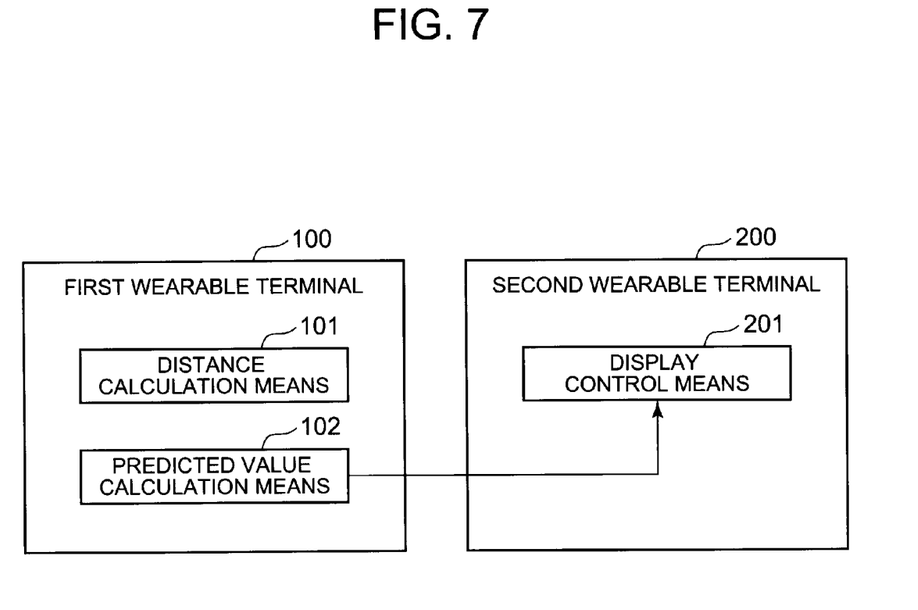
[FIG. 7] It depicts a block diagram illustrating an exemplary minimum structure of the work assistance system.

FIG. 7 is a block diagram illustrating an exemplary minimum structure of the work assistance system. As illustrated in Fig, 7, the work assistance system includes a first wearable terminal 100 connected to a measurement device capable of measuring predetermined physical amounts and a second wearable terminal 200 connected to a head-mounted display device as minimum constituents. The first wearable terminal 100 includes a distance calculation means 101 and a predicted value calculation means 102. Further, the second wearable terminal 200 includes a display control means 201.

In the work assistance system having the minimum structure illustrated in FIG. 7, the distance calculation means 101 calculates the distance from the second wearable terminal 200. Then, the predicted value calculation means 102 calculates a predicated value of the predetermined physical amount at a position of the second wearable terminal 200 based on a measurement value of the predetermined physical amount measured by the measurement device and the distance calculated by the distance calculation means 101. Then, the display control means 201 controls to display a predicted value calculated by the predicted value calculation means 102 on the head-mounted display device.

Therefore, according to the work assistance system having the minimum structure, when measurement data measured by the measurement device is shared among workers for securing safety, the workers can work even at positions away from the measurement device under secured safety.

The present exemplary embodiment demonstrates the following characteristic structures (1) to (5) of the work assistance system.

(1) The work assistance system includes the first wearable terminal (realized by the wearable terminal 30, for example) connected to the measurement device (realized by the Geiger counter 10, for example) capable of measuring predetermined physical amounts (such as the amount of radiation or gas density) and the second wearable terminal (realized by the wearable terminal 50, for example) connected to the head-mounted display device (realized by the head-mounted display device 40, for example), wherein the first wearable terminal includes the distance calculation means (realized by the communication distance/position measurement means 33, for example) for calculating a distance from the second wearable terminal and the predicted value calculation means (realized by the simulation means 34, for example) for calculating a predicted value of the predetermined physical amount at a position of the second wearable terminal based on a measurement value of the predetermined physical amount (such as radiation dose measurement data) measured by the measurement device and the distance calculated by the distance calculation means, and the second wearable terminal includes the display control means (realized by the data transmission/reception means 51, for example) for controlling to display the predicted value calculated by the predicted value calculation means on the head-mounted display device.

(2) The work assistance system may be configured such that a plurality of first wearable terminals each connected to the measurement device are provided, the second wearable terminal receives a predicted value of the predetermined physical amount at a position of the second wearable terminal calculated by the predicted value calculation means of a first wearable terminal closest to the second wearable terminal among the first wearable terminals, and the display control means controls to display the predicted value on the head-mounted display device.

(3) The work assistance system may be configured such that the predicted value calculation means makes simulation by use of a predetermined calculation equation based on a measurement value of the predetermined physical amount measured by the measurement device and a distance calculated by the distance calculation means, and calculates a predicted value of the predetermined physical amount at a position of the second wearable terminal.

(4) The work assistance system may be configured such that the predicted value calculation means makes simulation by use of the inverse-square law based on a measurement value of the predetermined physical amount measured by the measurement device and a distance calculated by the distance calculation means, and calculates a predicted value of the predetermined physical amount at a position of the second wearable terminal.

(5) The work assistance system may be configured such that the predicted value calculation means makes simulation by use of the inverse-square law assuming a predetermined position as a generation source based on a measurement value of the predetermined physical amount measured by the measurement device and a distance calculated by the distance calculation means, and calculates a predicted value of the predetermined physical amount at a position of the second wearable terminal.

The present invention has been described above with reference to the exemplary embodiment and examples, but the present invention is not limited to the above exemplary embodiment and examples. The structure and details of the present invention can be variously changed within the scope of the present invention understandable for those skilled in the art.

The present application claims the priority based on Japanese Patent Application No. 2011-152851 filed on Jul. 11, 2011, the disclosure of which is all incorporated herein by reference.

Industrial Applicability

The present invention is applicable to an application in which a work is performed while safety is being secured by use of not only a Geiger counter but also a gas measurement/detection device or chemical materials' measurement/detection device. In this case, measurement data by a measurement device can be shared among a plurality of workers in the same mechanism and structure as the present invention.

Reference Signs List
100 First wearable terminal
101 Distance calculation means
102 Predicted value calculation means
200 Second wearable terminal
201 Display control means

What is claimed is:

1. A work assistance system comprising:
a first wearable terminal connected to a measurement device capable of measuring predetermined physical amounts; and
a second wearable terminal connected to a head-mounted display device,
wherein the first wearable terminal includes:
a distance calculation unit which calculates the distance from the second wearable terminal; and
a predicted value calculation unit which calculates a predicted value of the predetermined physical amount at a position of the second wearable terminal based on a measurement value of the predetermined physical amount measured by the measurement device and the distance calculated by the distance calculation unit, and
the second wearable terminal includes a display control unit which controls to display the predicted value calculated by the predicted value calculation unit on the head-mounted display device.

2. The work assistance system according to claim 1, including a plurality of first wearable terminals each connected to a measurement device,
- wherein the second wearable terminal receives a predicted value of the predetermined physical amount at a position of the second wearable terminal calculated by the predicted value calculation unit of a first wearable terminal closest to the second wearable terminal among the first wearable terminals, and
- the display control unit controls to display the predicted value on the head-mounted display device.

3. The work assistance system according to claim 2,
- wherein the predicted value calculation unit makes simulation by use of a predetermined calculation equation based on a measurement value of the predetermined physical amount measured by the measurement device and a distance calculated by the distance calculation unit, and calculates a predicted value of the predetermined physical amount at a position of the second wearable terminal.

4. The work assistance system according to claim 3,
- wherein the predicted value calculation unit makes simulation by use of the inverse-square law based on a measurement value of the predetermined physical amount measured by the measurement device and a distance calculated by the distance calculation unit, and calculates a predicted value of the predetermined physical amount at a position of the second wearable terminal.

5. The work assistance system according to claim 4,
- wherein the predicted value calculation unit makes simulation by use of the inverse-square law assuming a predetermined position as a generation source based on a measurement value of the predetermined physical amount measured by the measurement device and a distance calculated by the distance calculation unit, and calculates a predicted value of the predetermined physical amount at a position of the second wearable terminal.

6. The work assistance system according to claim 1,
- wherein the predicted value calculation unit makes simulation by use of a predetermined calculation equation based on a measurement value of the predetermined physical amount measured by the measurement device and a distance calculated by the distance calculation unit, and calculates a predicted value of the predetermined physical amount at a position of the second wearable terminal.

7. The work assistance system according to claim 6,
- wherein the predicted value calculation unit makes simulation by use of the inverse-square law based on a measurement value of the predetermined physical amount measured by the measurement device and a distance calculated by the distance calculation unit, and calculates a predicted value of the predetermined physical amount at a position of the second wearable terminal.

8. The work assistance system according to claim 7,
- wherein the predicted value calculation unit makes simulation by use of the inverse-square law assuming a predetermined position as a generation source based on a measurement value of the predetermined physical amount measured by the measurement device and a distance calculated by the distance calculation unit, and calculates a predicted value of the predetermined physical amount at a position of the second wearable terminal.

9. A wearable terminal comprising:
- a distance calculation unit which calculates the distance from other wearable terminal; and
- a predicted value calculation unit which calculates a predicted value of the predetermined physical amount at a position of the other wearable terminal based on a measurement value of the predetermined physical amount measured by a measurement device capable of measuring predetermined physical amounts and the distance calculated by the distance calculation unit.

10. A work assistance method comprising the steps of:
- calculating a distance between a first wearable terminal connected to a measurement device capable of measuring predetermined physical amounts and a second wearable terminal connected to a head-mounted display device;
- calculating a predicted value of the predetermined physical amount at a position of the second wearable terminal based on a measurement value of the predetermined physical amount measured by the measurement device and the calculated distance; and
- controlling to display the calculated predicted value on the head-mounted display device.

* * * * *